P. I. Steere,
Making Barrel Heads.
N° 9,699.    Patented May 3 1853.
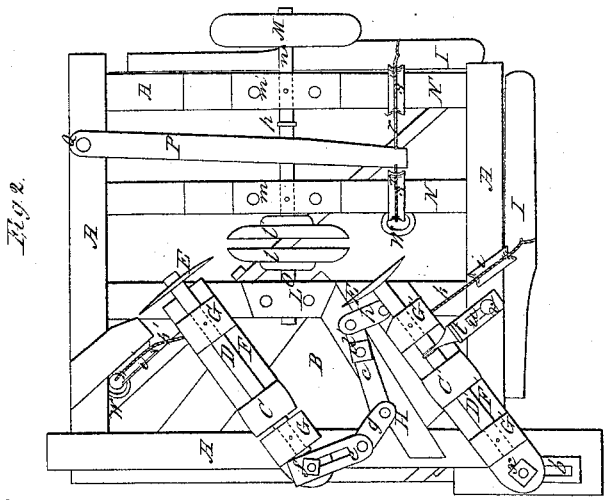
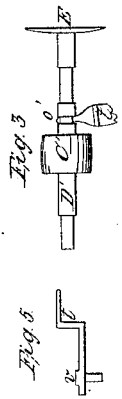
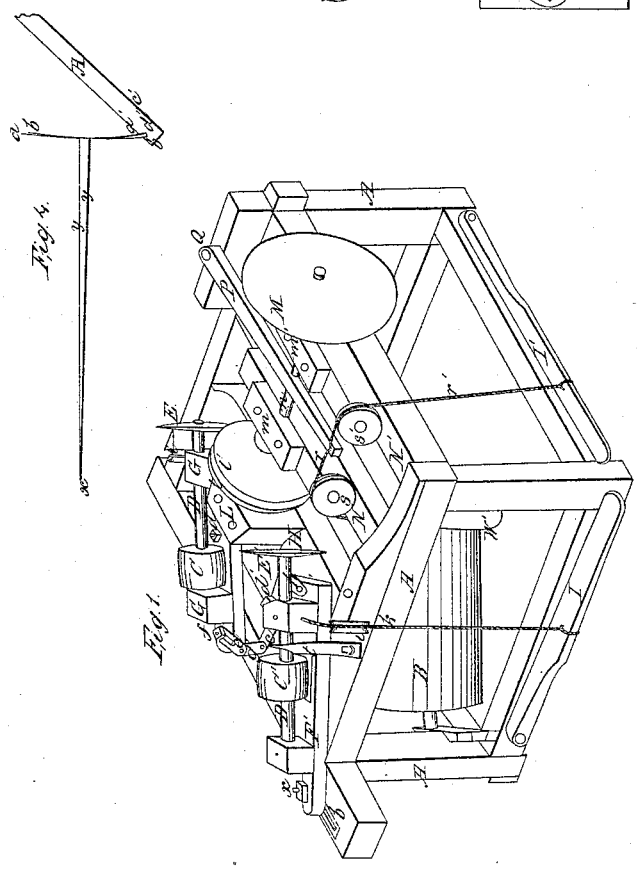

UNITED STATES PATENT OFFICE.

PARIS I. STEERE, OF CHESHIRE, MASSACHUSETTS.

MACHINE FOR SAWING BARREL-HEADS.

Specification of Letters Patent No. 9,699, dated May 3, 1853.

*To all whom it may concern:*

Be it known that I, PARIS I. STEERE, of Cheshire, in the county of Berkshire and State of Massachusetts, have invented a new and useful Machine for Sawing Barrel-Heads; and I hereby declare that the following is a full, clear, and exact description of the same, reference being had to the annexed drawings, making part of this specification.

In the machinery heretofore in use for cutting barrel heads, the head blocks are made to revolve rapidly in contact with stationary knives, and the pieces of surplus stuff separated by these knives are often thrown off centrifugally with great force, and become the cause of painful and fatal accidents to the operatives and others around.

To obviate these inconveniences I have invented the following described machine, in which the barrel heads are cut by two dishing circular saws, which are brought in contact with the stuff to be cut, one forming the short or upper bevel of the head, and the other the long, or lower bevel.

Figure 1 is a perspective view of my machine; Fig. 2 a plan of the same; Figs. 3 and 4 details which will be referred to hereafter; Fig. 5 a side view of the finger $t$.

A is the framework of the machine.

B is the main drum which is driven in any convenient manner, and from which the saws derive their motion.

C, C', are pulleys upon shafts D, D', which carry the saws E, E'.

F is a movable, adjustable carriage, having puppet heads G, in which revolves the shaft D of the saw E. The carriage F has a limited rotary motion around the point $d$, and the carriage F', which is similar to the one just described, and which carries the saw E', has a limited motion around the point $x$, which center of motion is made adjustable by means of the nut and screw $x$, Figs. 1 and 2, and slot $b$, for the purpose of adapting the position of the saw to the size of the heads to be cut. The saw E' cuts the upper or short bevel of the head, and the saw E the under or long bevel; their motions are made dependent one upon the other in the following manner.

$c$ is a metallic lever pivoted to the stationary bar H at the point $d$, around which point it is free to move.

$e$ is a metallic slotted bar secured to the carriage F by the nut $f$, by means of which the carriage F and saw E are adjusted to the size of the head to be cut.

$g$ is a flexible link which connects the bar $e$ with one end of the lever $c$, which lever at its other extremity is connected to the frame F' by the flexible link $h$, from which it will appear that whatever motion be communicated to one of the saws will be shared by the other. The arm of the lever $c$, which is connected with the carriage F', being shorter than the arm of the same lever which is connected with the carriage F, the latter will have a much more extended motion than the former. This is made necessary by the fact already noticed that the saw E' has only a short bevel to cut, and consequently should move but a comparatively short distance, while the saw E cuts entirely through the head, and requires a more extended motion. The saws E, E', are slightly dished to accommodate them to the curve of the head, and it is found, that considerable latitude may be given to the size of the head, without varying the dish of the saw.

$i$ is a guide pulley, over which passes the cord $k$, one end of which is attached to the carriage F' and the other to the treadle I. $i'$ is another guide pulley, over which passes a cord $k$, one end of which is attached to the carriage F and the other to the weight W.

$l$ is the stationary cheek of the clamp which holds the stuff to be worked. It is attached to a shaft $o$, which revolves in the block L, rising from the frame-work of the machine.

$l'$ is the movable clamp-check, and is attached to the shaft $n$, which runs in blocks $m$, $m'$, supported upon the cross bars N, N', of the frame-work of the machine. At the other extremity of this shaft $n$ is a hand wheel M, by which the motion of the clamp is regulated while the stuff is being cut.

The shaft $n$ has a limited longitudinal motion in the blocks $m$, $m'$, for the purpose of clamping and unclamping the heading material. This motion is governed in the following manner: P is a lever hinged at Q, and having a slight horizontal motion around this point as a center. In Fig. 2 this lever is raised out of its working position to show its connection with the shaft. $p$ is a collar on the shaft $n$, fitting into a groove on the under side of the lever P. $r$ and $r'$ are cords passing over pulleys $s$, $s'$, the cord $r$ having a weight $W'$ attached to it, and the cord $r'$ being attached to the treadle $I'$. The weight $W'$ serves to close the clamp which is opened when required by pressure upon the treadle $I'$.

Fig. 4, is a diagram illustrating the operation of the saw $E'$ and the finger $t$. Let $x$ represent the point around which the saw carriage $F'$ vibrates, $A'$ the piece of stuff from which the head is to be cut. Suppose $a$, $a'$, to be the position of the saw, and $y$ the axis of its shaft, at the instant it commences to cut. Suppose the saw carriage to be revolved upon $x$ until the saw is in the position $b$, $b'$, its axis of revolution being $y'$, it will be apparent that considerable friction will result while the saw is passing from $a$ to $b$. To obviate this it is necessary that the saw, during the time that it is cutting the short level, should have a motion forward, equal to the size of the angle $b'$, $a'$, $d''$, which will bring the lower edge of the saw to the point $d''$ instead of $b'$, as before. In order to effect this motion of the saw, its shaft is allowed a slight longitudinal motion in the boxes $G'$, $G'$, which motion is regulated in the following manner: $o'$, Fig. 3, is a groove in the shaft $D$, in which rests the point of a guide finger $t$, Figs. 1, 2, and 5, which is set slightly inclined from an angle of 90° with the axis of said shaft (as seen in red in Fig. 3). When therefore the axis of the saw is revolved around the point $x$ from the position $y$ to $y'$, the side of the groove $o'$, bearing against the finger $t$, forces the saw forward, in proportion as it is revolved, and enables it to cut from $a'$ to $d''$, instead of from $a'$ to $b'$, as would be the case were the saw shaft confined rigidly to the carriage. The finger $t$ is adjusted by means of the slot $u$ and screw $v$ to adapt it to the adjustments of the carriage. No such difficulty occurs with the saw $E$, as the center upon which it is dished is upon the same side of the saw as the center of motion of the carriage, though it is not required that the radius of curvature of the saw should correspond with its radius of vibration.

Operation: The saws are driven by bands from the main driving pulley $B$, and are constantly in motion while the machine is in operation. The operator commences by adjusting the saw carriages and finger $t$ to the size of the head to be cut; he then presses his foot upon the treadle $I'$, which opens the clamp $b'$; the stuff to be cut is then put in, the treadle is released, and the clamp is closed by the weight $W'$. The treadle $I$ is then depressed, and the saws are brought into contact with the stuff, the saw $E'$ making but a slight cut into the board, and the other clearing away all the surplus stuff, and forming the long or lower bevel, the finger $t$ having, during the motion of the carriage $F'$, advanced the saw the requisite amount in its bearings as already described. The operator then lays hold of the hand wheel $M$, and by turning it, revolves the clamp, and with it the head in contact with the saws, one revolution of the clamp sufficing to complete the head. The treadle $I$ is then released, and the saws are retracted by the weight $W$, Fig. 2, a cord from which passing over the pulley $i'$ is attached to the carriage $F$. The carriages being connected by means of the lever $c$ and links $h$ and $q$, as already described, when the carriage $F$ is withdrawn the other follows. The operator then opens the clamp by pressing upon the treadle $I'$, the finished head falls out, and another is put into the clamp, the operation continuing as before. The clamp cheeks may be furnished with points, or in any other suitable manner adapted to the holding of the head.

Having thus described my invention, what I claim as new and desire to secure by Letters Patent, is—

The finger $L$, in combination with the movable shaft $D$, for the purpose of converting the curvilinear motion of the saw into a rectilinear motion, in the manner substantially as described.

In testimony whereof I have hereto set my signature this sixteenth day of November A. D. 1852.

PARIS I. STEERE.

Signed by the above named PARIS I. STEERE in presence of us—

ROBT. W. ADAM,
LORENCE W. GAMWELL.